United States Patent
Wu et al.

(10) Patent No.: US 10,274,773 B2
(45) Date of Patent: Apr. 30, 2019

(54) DEVICE WITH POLYMER DISPERSED LIQUID CRYSTALS

(71) Applicant: HEWLETT-PACKARD DEVELOPMENT COMPANY, L.P., Houston, TX (US)

(72) Inventors: Kuan-Ting Wu, Taipei (TW); Wei Kuang Chu, Taipei (TW); Cheng-Hua Yu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/563,241

(22) PCT Filed: Jul. 30, 2015

(86) PCT No.: PCT/US2015/042862
§ 371 (c)(1),
(2) Date: Sep. 29, 2017

(87) PCT Pub. No.: WO2017/019082
PCT Pub. Date: Feb. 2, 2017

(65) Prior Publication Data
US 2018/0129084 A1 May 10, 2018

(51) Int. Cl.
*G02F 1/1334* (2006.01)
*G02F 1/137* (2006.01)

(52) U.S. Cl.
CPC .. *G02F 1/1334* (2013.01); *G02F 2001/13756* (2013.01)

(58) Field of Classification Search
CPC ...................................................... G02F 1/1334
See application file for complete search history.

(56) References Cited

U.S. PATENT DOCUMENTS

| | | |
|---|---|---|
| 8,502,816 B2 | 8/2013 | Butler et al. |
| 8,830,221 B2 | 9/2014 | Yeh et al. |
| 8,891,032 B2 | 11/2014 | Ijzerman et al. |
| 8,896,507 B2 | 11/2014 | Broughton et al. |
| 2005/0174529 A1 | 8/2005 | Fukushima et al. |
| 2008/0310018 A1 | 12/2008 | Tripp |
| 2010/0295755 A1 | 11/2010 | Broughton |
| 2013/0300985 A1 | 11/2013 | Bulda |
| 2014/0043452 A1 | 2/2014 | Ehrlacher |
| 2014/0226093 A1 | 8/2014 | Schwartz et al. |
| 2014/0232960 A1* | 8/2014 | Schwartz ............. G02B 26/004 349/12 |

OTHER PUBLICATIONS

Young Jin Lim et al., "Viewing Angle Switching of Patterned Vertical Aitgriment Liquid Crystal Display," Journal of Physics D: Applied Physics, 2008, vol. 41, No. 8, pp. 1-2, IOP Publishing.

* cited by examiner

*Primary Examiner* — Edmond C Lau
(74) *Attorney, Agent, or Firm* — Fabian VanCott (57) ABSTRACT

In one example in accordance with the present disclosure a device is described. The device includes a first electrode. The device also includes a second electrode. The device also includes multiple polymer dispersed liquid crystals (PDLCs). The multiple PDLCs are disposed between the first and the second electrode and are of varying height.

20 Claims, 7 Drawing Sheets

DEVICE WITH POLYMER DISPERSED LIQUID CRYSTALS

BACKGROUND

Electronic devices include display screens to present information to a user. Examples of display screens include liquid crystal displays, light-emitting diode displays, video display units, and the like. Such devices are used in many areas of professional and everyday life throughout the world. These electronic devices and corresponding display screens are used to access and display all sorts of information.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

As described above, electronic devices have widespread use in society and all indications are that such usage is on an upward trend. The types of information that can be shared via these electronic devices are also expanding. In some cases, the electronic devices are used in public settings. For example electronic devices and other devices with display screens are increasingly being used in public places to deliver services to the public in general. While such electronic device usage is of great benefit to society, some characteristics limit their more widespread use.

For example, in some cases, the information displayed to a user may be private and confidential, intended only for a certain individual or group of individuals. It may be difficult to keep such information private, for example when the electronic device is in a public setting. Examples of electronic devices used in public where personal information may be displayed include an automated teller machine ("ATM"), a visual display unit ("VDU") in an office displaying, for example, personnel records, medical records, or other confidential information. In many cases, it is not possible or practical to restrict movement of people in the vicinity of the display who have no need to see the displayed information. In such cases, there is a possibility that the displayed information may be seen by unauthorized people who may use the information to the disadvantage of a person or persons that the information concerns.

As another example, personal laptops or notebook computers may be used in crowded public areas such as airports, train stations, or other public areas. As is common, such devices may be used for personal matters, i.e., writing a personal letter, working on professional matters that may have sensitive or otherwise confidential information. When used in these areas, there is no guarantee that such information will remain private or confidential as passersby may be able to view the electronic device display screen and ascertain the information therein. More specifically, there may be a general concern that a nearby person, such as the person in the next airplane seat, may be reading the material on the laptop or notebook computer. If the computer or other electronic device is used in this way, sensitive data may be stolen. This concern may keep many people from using a laptop computer in many instances when its use would be particularly convenient.

Accordingly, the devices and systems of the present specification and the appended claims address these and other issues. Specifically, the present specification and the appended claims use multiple polymer dispersed liquid crystals (PDLCs) to increase privacy of a display screen. The PDLCs may have varying height to reduce the effective viewing area of the screen. In some examples, the device may be a multi-modal driven device to further increase the privacy control to the underlying display screen. In some examples, the PDLCs may be divided up into groups, each group offering privacy to a corresponding region of a display screen such that multiple users may use one screen, but only have viewing privileges to a portion of the screen.

The present specification describes a device for increased privacy control of a display device. The device includes at least one electrode. Multiple PDLCs are disposed between the at least one electrode and a viewer of the device. The multiple PDLCs allow for viewing of an underlying substrate when in one state and prevent the viewing of the underlying substrate when in another state.

The present specification also describes a device for increased privacy control of a display device. This device includes a substrate and a privacy control layer. The privacy control layer includes multiple PDLCs dispersed in a matrix comprising at least one of a glass and a plastic. The multiple PDLCs are of varying height and are divided into groups. Each group of PDLCs allows a user within a viewing area of the group to view the substrate and prevents users outside of the viewing area of the group from viewing the substrate. A first electrode and a second electrode are disposed on either side of the multiple PDLCs to generate a voltage potential across the multiple PDLCs.

The present specification also describes a system for increased privacy control of a display device. This system includes a substrate, a first transparent electrode and a second transparent electrode. The system also includes a privacy control layer disposed between the first transparent electrode and the second transparent electrode. The privacy control layer includes multiple PDLCs dispersed in a matrix comprising at least one of a glass and a plastic. The multiple PDLCs are of varying height. The system also includes a switch controller to provide an activation energy to the first transparent electrode and the second transparent electrode. The activation energy turns the multiple PDLCS on and off.

Certain examples of the present disclosure are directed to a system and device for providing increased privacy control for electronic displays that 1) provide a number of private viewing areas on a screen; 2) protect sensitive data from inadvertent or malicious viewers; 3) offer a user friendly solution with multiple driving technologies; 4) allow multiple users to view different secure information on one display screen; and 5) provide greater flexibility in selecting a degree of privacy control. However, it is contemplated that the devices and systems disclosed herein may prove useful in addressing other deficiencies in a number of technical areas. Therefore the systems and devices disclosed herein should not be construed as addressing just the particular elements or deficiencies discussed herein.

As used in the present specification and in the appended claims, the term "viewing area" and similar terminology refers broadly to an area outside of a grouping of PDLCs wherein an individual sitting may view a corresponding portion of an underlying substrate. A user outside of the viewing area, on account of the PDLCs being activated, cannot view the corresponding portion of the underlying substrate. For example, one group of PDLCs may have a viewing area that a user, when in that viewing area, can see the underlying substrate and when outside that viewing area cannot see the underlying substrate.

Further, as used in the present specification and in the appended claims, the term "on" and "off" refer to a PDLCs ability to either reduce the privacy level, i.e., increase the viewing area, or increase the privacy level, i.e., reduce the viewing area. For example, PDLCs that are "on" reduce the viewing area by shielding the transmission of light from the display screen from certain angles and a PDLC that is "off" does not prevent viewing of an underlying display screen by allowing the transmission of light from the display screen.

Still further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present devices and systems. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Figure 1A:
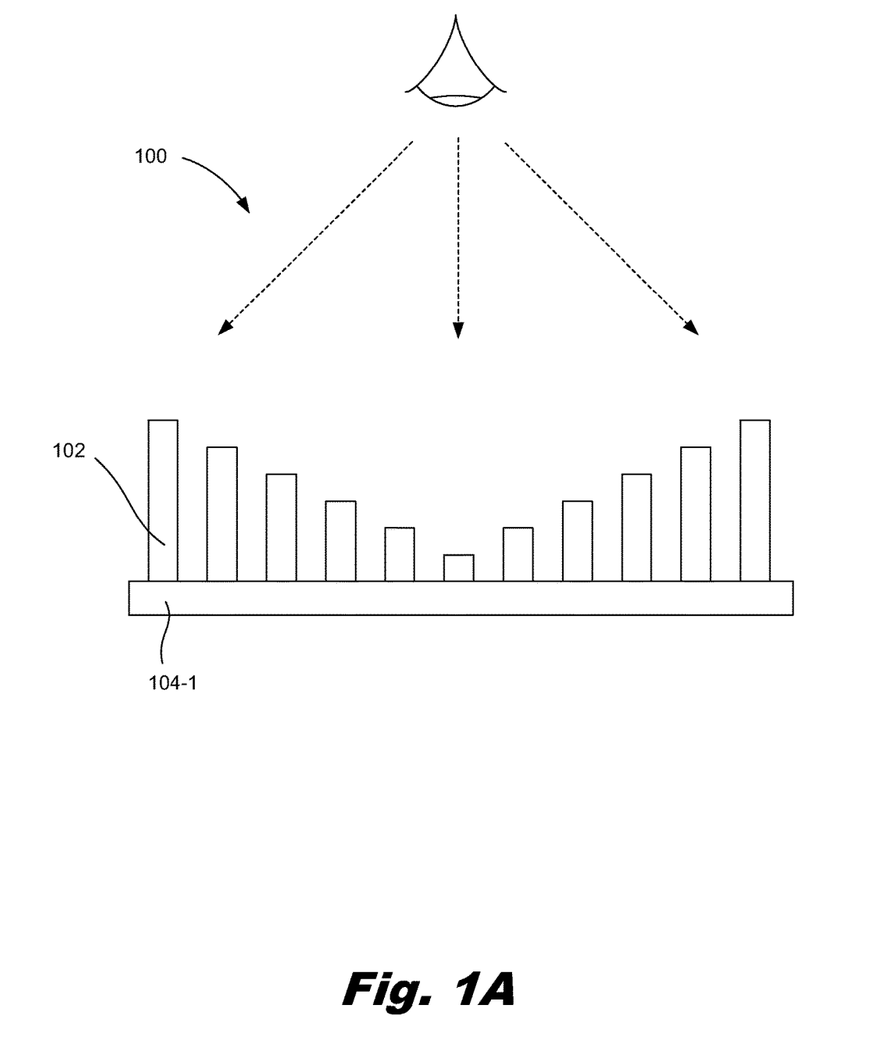
FIGS. 1A and 1B are diagrams of a device with multiple polymer dispersed liquid crystals (PDLCs), according to one example of the principles described herein.
Figure 1B:
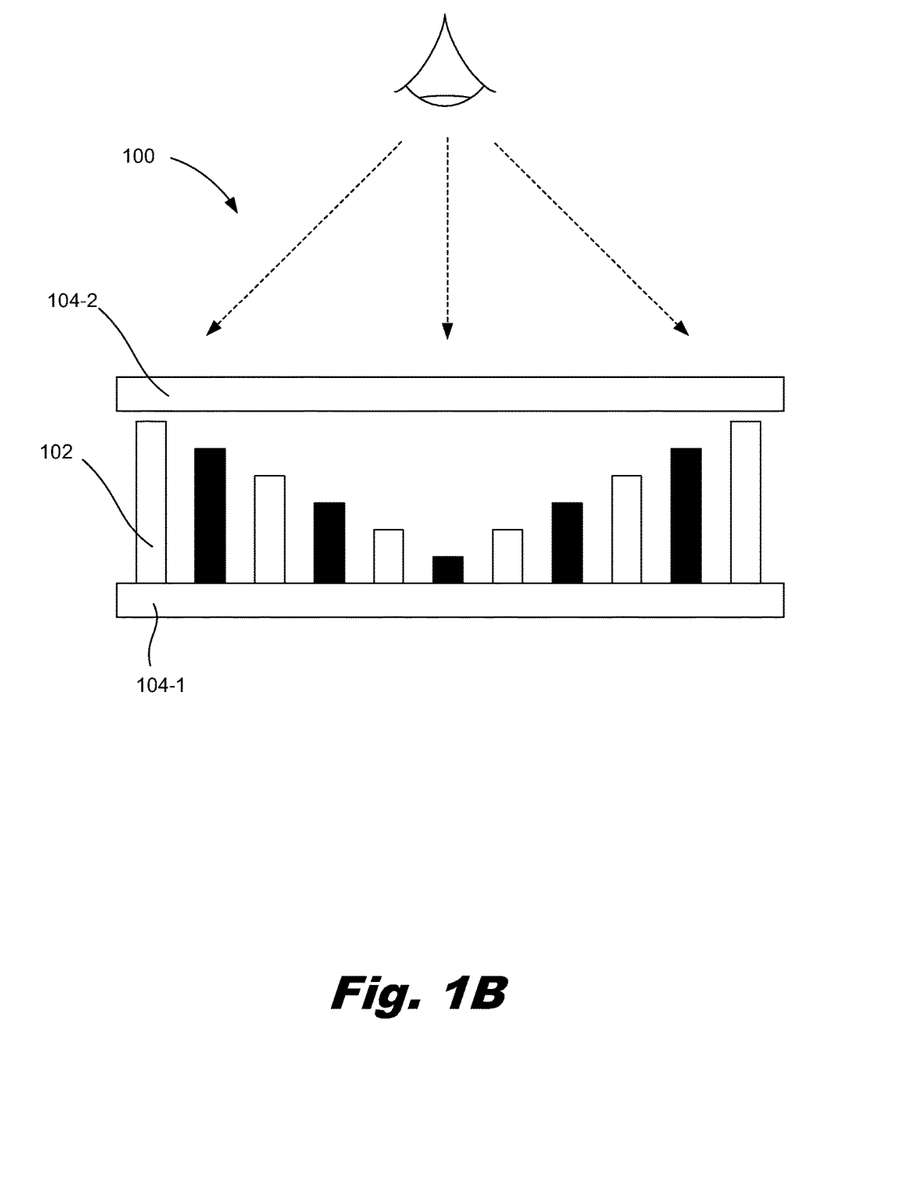

Turning now to the figures, FIGS. 1A and 1B are diagrams of a device (100) with multiple polymer dispersed liquid crystals (PDLCs) (102), according to one example of the principles described herein. For simplicity, in the figures, one instance of a PDLC (102) is indicated by a reference number. The device (100) may be employed to provide privacy to the user of an electronic device by altering the transmission of light through the device (100) so as to control the viewability of the underlying substrate, which underlying substrate may be a display screen of an electronic display. In other words, the device (100) is a privacy filter/screen that provides privacy during the use of an electronic device such as a laptop computer or other electronic device by restricting the viewing angle through which the display screen of the underlying electronic device may be viewed so that only a person sitting directly in front of the screen may read the data written on it. This angle may be reduced by placing the device (100) across the front of the electronic device display screen, so that the electronic device display screen may only be viewed through the privacy device.

The device (100) may be placed over the substrate, e.g., the display screen, to inhibit individuals sitting nearby, but not aligned with the display screen, from seeing the information presented on the display screen. The device (100) may be integrated with the display screen, or may be added to the display screen and detachably coupled as an electronic privacy filter. In one example, the device (100) is integrated with the display screen as one single device article.

The viewing angle, related to viewability of the display as a result of the device (100), may be controlled (e.g., increased or decreased) by liquid crystal materials. For example, polymer dispersed liquid crystals (PDLCs) (102) may be electronically switched between a relatively transparent state and a light-scattering state. In the light-scattering state of the PDLCs (102), the viewing angle of the display may be increased while in a transparent state the PDLCs (102) decrease the viewing angle of the display. In other words, in a transparent state, more light transmission is shielded, thus providing more privacy for viewing the underlying substrate. By comparison, in a light-scattering state, less light transmission is shielded, thus providing relatively less privacy. In the figures, the different privacy modes are indicated by the coloration of the PDLCs (102). For example, in FIG. 1A, all the PDLCs (102) are white, indicating one level of privacy such as provided when the PDLCs (102) are in a light-scattering state. By comparison, in FIG. 1B, the PDLCs (102) are alternating white and black, indicating another level of privacy such as when the PDLC (102) are in a transparent state. In other words, the PDLCs (102) as described herein may offer varying levels of privacy control, for example a transparent state (higher privacy) and a light, scattering state (less privacy). As will be demonstrated below, various combinations of layers of liquid crystal materials and/or other optical materials with electrically modifiable properties may be utilized to construct the electronic privacy device (100).

The PDLCs (102) may be electronically switched between a relatively transparent state ("ON") and a light-scattering state ("OFF"). As described above, in the light-scattering state of the PDLC (102), the viewing angle of the display may be increased thus providing a more publicly viewable display. In other words, when in a light-scattering state, the PDLCs (102) do not alter the transmission of light such that it may be seen from wider viewing angles. By comparison, in the transparent "ON" state, the light from the electronic display pixels may pass through the PDLC (102) material relatively unchanged, providing the relatively more private mode.

The relatively more private and public modes may correspond to the respective viewing angles of the electronic device display screen. In the transparent state, the visibility of the electronic device display screen corresponds to the relatively narrow viewing angle of the underlying electronic display substrate. In the light-scattering state, the visibility of the electronic device display screen corresponds to a relatively wider viewing angle provided by the view angle enhancement of the PDLC (102) material (e.g. the light scattering effect of the PDLC). Put another way, the underlying substrate may appear to be brighter when the PDLCs (102) are in a light-scattering state as compared to when the PDLCs (102) are in a transparent state.

In some examples, the multiple PDLCs (102) may be of varying height. The different heights of the PDLCs (102) affect their ability to provide privacy. For example, taller PDLCs (102) provide more privacy by inhibiting the transmission of light from the underlying substrate to a greater degree as compared to shorter PDLCs (102). Specifically as demonstrated in FIGS. 1A and 2B, the PDLCs (102) that are nearest the focal point of a viewing area are smaller than other PDLCs (102) within a grouping of PDLCs (102). In this example, the profile of the different PDLCs (102) forms a "V" shape, which allows for greatest visibility at a center, or low point, of the "V", and less visibility at the peripheries of the PDLC (102) grouping. Such a "V" formation of the PDLCs (102) allows for greatest visibility at the center of the grouping of PDLCs (102) and travelling laterally away from the center, viewability is reduced as the height of the PDLCs (102) increases going outward from the center.

In one example, the PDLCs (102) are a few micrometers across in dimension. The PDLCs (102) may have a shape of cylinders and each cylinder may have a diameter of between 10 μm and 150 μm. For example, each cylinder may have a diameter between 50 μm and 100 μm. Other values are also possible. In one example, the cylinder-shaped PDLCs (102) may have a maximum height of between 100 μm and 250 μm. For example, the tallest cylinder-shaped PDLCs (102), i.e., those at the peripheries may have a height between 150 μm and 200 μm. Other values are also possible. The multiple PDLCs (102) may be separated from each other by any suitable distance. In one example, each pair of PDLCs (102) is separated from each other by a distance of between 200 μm and 350 μm. For example, adjacent PDLCs (102) may be separated from each other by 250 μm to 300 μm. Other values are also possible. While specific numerical examples have been provided regarding the dimension and spacing of the PDLCs (102), the PDLCs (102) may have any suitable dimensions, depending on the application. As used in the present specification and the appended claims "dimension" herein may refer to length, width, height, diameter, etc., depending on the geometry.

Various combinations of layers of liquid crystal materials and/or other optical materials with electrically modifiable properties may be utilized to construct the PDLCs (102). For example, the PDLCs (102) may include lyotropic liquid crystals, bi-stable twisted nematic, surface stabilized ferroelectric liquid crystals (FLCs), scattering smectic A, grating aligned zenithal b-stable liquid crystal and bi-stable cholesteric liquid crystals.

The device (100) may include at least one electrode (104). For example, as depicted in FIG. 1A, the device (100) may include one electrode (104-1) disposed between the PDLCs (102) and a viewer of the underlying substrate. In the present specification the notation "-*" indicates a specific instance of an element. For example, 104-1 references a particular electrode. By comparison, a reference number without the "-*" references the element generically. For example, (104) references a generic electrode.

A single electrode (104) device (100) may be used to carry out in-plane switching and plane-to-line switching. In an in-plane switching mode an electric field is generated parallel to the first electrode (104-1).

In another example, as depicted in FIG. 1B, a layer comprising the multiple PDLCs (102) may be sandwiched between two electrodes (104), specifically a first electrode (104-1) and a second electrode (104-2). A two electrode (104-1,104-2) device (100) may be used to carry out twisted nematic and vertical alignment modes of the device (100). In a twisted nematic mode, the PDLCs (102) may be in a twisted configuration when in an "off" state, but when turned "on", the PDLCs (102) align themselves with the first electrode (104-1) and the second electrode (104-2). In a vertical alignment mode when in an "off" state the PDLCs (102) are perpendicular to the electrodes (104-1, 104-2), but when turned "on", align vertically between the electrodes (104-1, 104-2).

The electrodes (104) may be glass or plastic and may include a thin layer of transparent conductive material, such as indium tin oxide. The electrodes (104) serve to generate a voltage potential across the PDLCs (102). In one example, the described controlling of the PDLC (102) state may be through applying a voltage to the electrodes. The voltage may be from a voltage or power source internal to the device (100) or external to the device (100). In one example, the power source for the PDLC (102), may be drawn from a processor-based device. For example, direct current ("DC") power may be provided from the battery of the electronic device, of which the display screen is a part. In another example, when the electronic device is plugged in for charging, power may be provided from the alternating current ("AC") adapter or from the power conversion circuit within the electronic device.

Each of the electrodes (104-1, 104-2) may be formed of any electrically conductive material. The electrodes (104-1, 104-2) may include a transparent conductive film. The transparent conductive film may be formed of inorganic materials, organic materials, or both. Examples of inorganic material include transparent conducting oxides such as indium tin oxide, fluorine doped tin oxide, and doped zinc oxide among other transparent conducting oxides. Examples of organic materials include carbon nanotubes, graphene, poly(3,4-ethylenedioxythiophene). In one example, the electrodes (104) include at least one of $In_2O_3$:Sn and $SnO_2$:F. The conductive electrodes (104) may provide suitable electrodes for applying a voltage across the PDLC (102) material.

As described above, the PDLC (102) state may be controlled by at least one voltage passed via the electrodes (104). Thus, switching between public and private modes may be performed by the user without applying external devices to achieve privacy. By changing the orientation of the PDLCs (102) with an electric field, it is possible to vary the light being transmitted through the PDLC (102), thereby varying the intensity of transmitted light.

Using PDLCs (102) having different heights may be beneficial by providing a viewing area within which a user can view a screen, or a portion of a screen while preventing users outside of the viewing area from being able to see the screen. Moreover, the varied column heights of the PDLCs (102) may further increase the privacy by placing taller PDLCs (102) near the peripheries such that users to the side of the intended user cannot view the underlying substrate. In other words, the taller PDLCs (102) placed at the periphery of an area of the screen blur the screen or block the screen from individuals or other users to the side of the user viewing the particular region.

Figure 2:
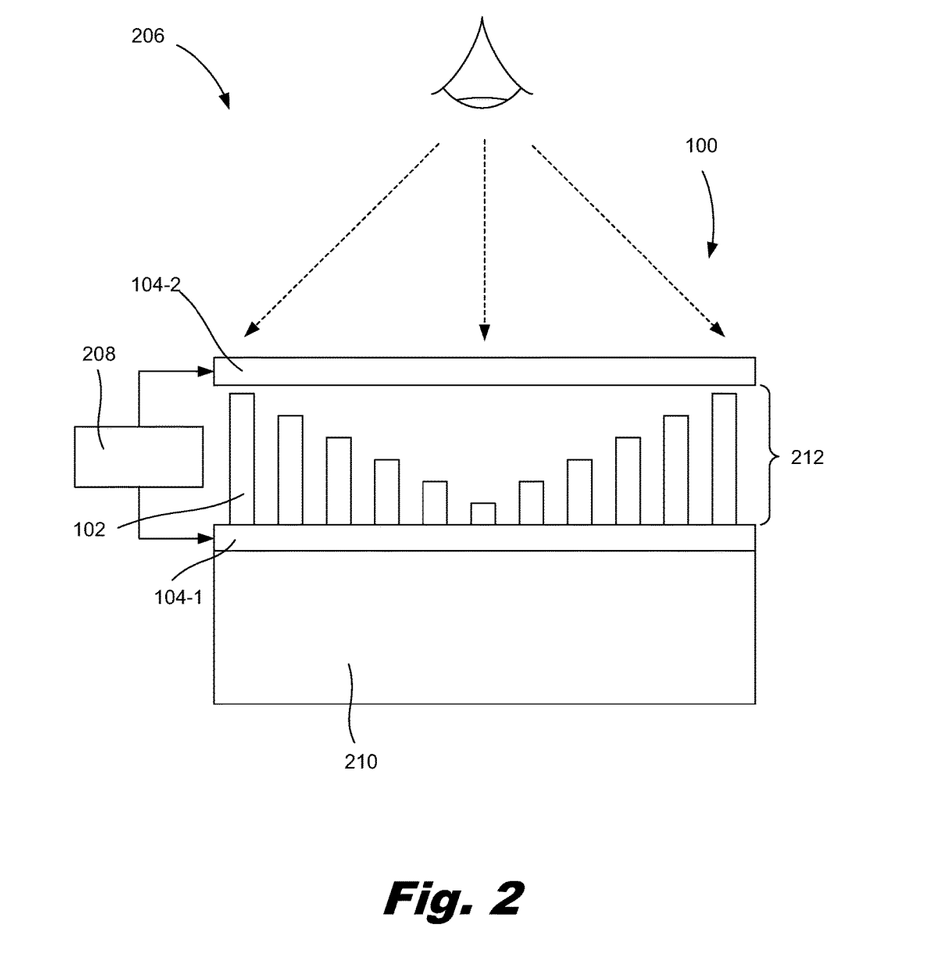
FIG. 2 is a diagram of a system with multiple PDLCs, according to one example of the principles described herein.
Figure 3:
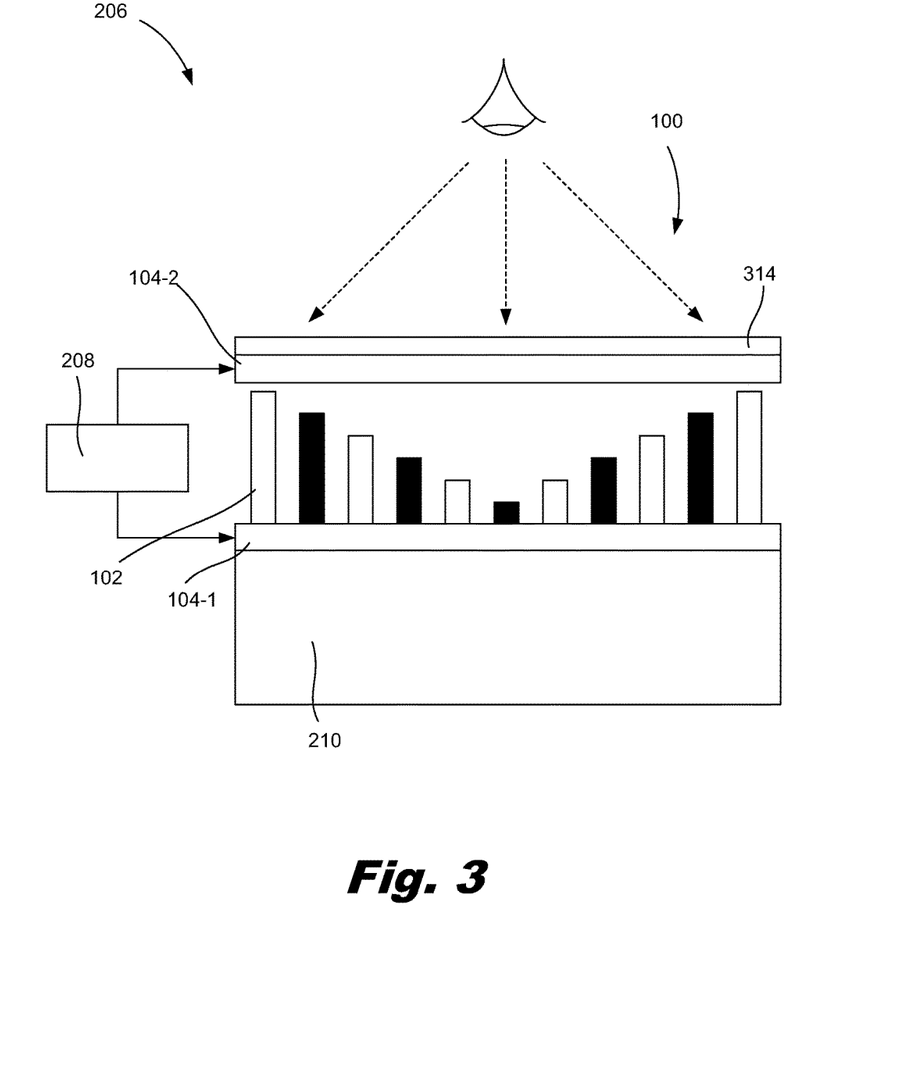
FIG. 3 is a diagram of a system with multiple PDLCs, according to another example of the principles described herein.

FIG. 2 is a diagram of a system (206) with multiple PDLCs (102), according to one example of the principles described herein. Specifically, FIG. 2 depicts the system (206) in one state, such as a light-scattering state as indicated by the PDLCs (102) of the same color. By comparison, FIG. 3 depicts the system (206) in another state, such as a transparent state, as indicated by the PDLCs (102) of alternating color.

Returning to FIG. 2, in this example, the device (100) is disposed on a substrate (210). In some examples, the substrate (210) may be a display screen of an electronic device. A display screen may include any device, or component thereof, that permits transmission and output of information electronically to a user (e.g., viewer). The information may be visual or audio, among other formats of information presentation. In one example, the display screen has the capability of displaying at least visual signals. In one example, the display screen is an electronic visual display. The display screen may be a part of an electronic device. As used in the present specification and in the appended claims, an electronic device herein may refer to any device that includes an electrical circuit. The electronic device may be a consumer electronic device. Examples of electronic devices include portable/mobile electronic devices, a television, a computer, a desktop computer, a laptop, a tablet, and a gaming device among other electronic devices. A display screen of an electronic device may refer to a monitor, a liquid crystal display ("LCD"), an organic light-emitting diode ("OLED") display, a polymer light-emitting diode ("PLED") display, a plasma display, an electrowetting display, and a bi-stable display. Examples of bi-stable displays include electrophoretic displays, cholesteric liquid crystal displays and MEMS-based displays. Other types of electronic displays are also possible.

In some examples, the PDLCs (102) may form part of a privacy control layer (212). The privacy control layer (212) includes the PDLCs (102) as described above that are dispersed in a solid polymer matrix. The solid polymer matrix may be formed of any suitable material including glass or plastic. Examples of glasses that may be used as the solid polymer matrix include soda lime glass, alkali glass, boron silicate glass, non-alkali metal aluminum silicate glass, and fused silica glass, among other glasses. Examples of plastics that may be used as the solid polymer matrix include optical substrates, such as poly(methyl-methacrylate) ("PMMA"), polyethylene terephthalate ("PET"), cyclic olefin copolymer ("COC"), polycarbonate, and polyimide; transparent plastics; and transparent plastic composites.

In some examples, the system (206) includes a switch controller (208) for applying an activation energy such as a voltage to the transparent electrodes (104). This activation energy serves to turn the PDLCs (102) on and off, or places them in a transparent state and a light-scattering state, respectively. Specifically, the activation energy, such as a voltage, may alter the tilt angle of the PDLCs (102) thereby altering their ability to transmit or scatter light. In some examples, different activation energies may set the PDLCs (102) to varying degrees of transparency. For example, an activation energy of one value may set the PDLCs (102) to a state that is more transparent and an activation energy of a second value may set the PDLCs (102) to a state that is less transparent. Put another way, a voltage of one value may effectuate greater privacy control by setting the PDLCs (102) to a particular tilt angle and a voltage of a different value may effectuate lesser privacy control by setting the PDLCs (102) to a different tilt angle that affords a different degree of privacy control.

The activation energies provided by the switch controller (208) adjust the viewing area of the different portions of the underlying substrate (210). For example, the switch controller (208) may pass different voltage values to the electrodes (104) which may have varying effect on the PDLCs (102). For example, the switch controller (208) may apply different voltage values to effectuate different levels of privacy control. In other words, the switch controller (208) may provide different activation energies to render the multiple PDLCs (102) to different states of transparency or opacity.

FIG. 3 is a diagram of a system (206) with multiple PDLCs (102), according to another example of the principles described herein. In some examples, the device (100) may further include a cover lens (314) disposed over one of the electrodes (104), for example an electrode (104) that is exposed to a user. The cover lens (314) may be a plastic or class substrate that protects the electrodes (104) and other components of the electronic device and device (100) from becoming damaged during use.

In some examples, the device (100) may be a multi-modal device (100) meaning that the device (100) may afford different degrees of privacy. For example, in a first mode, as depicted in FIG. 1A, the PDLCs (102) may offer one degree of privacy and in a second mode, as depicted in FIG. 3, the PDLCs (102) may offer another degree of privacy. In the figures, a multi-modal device (100) is indicated by the alternating PDLC (102) colors.

The setting of PDLCs (102) to different tilt angles to generate different levels of privacy may be referred to as multi-modal driving as the PDLCs (102) are driven to different modes (i.e., tilt angles). While the present figures depict two modes, i.e., a bi-modal driving, any number of modes may be used in setting the privacy level of the device (100). Such bi-modal or multi-modal driving of the device (100) may allow for greater flexibility in tailoring the privacy of a display screen substrate (208).

Figure 4:
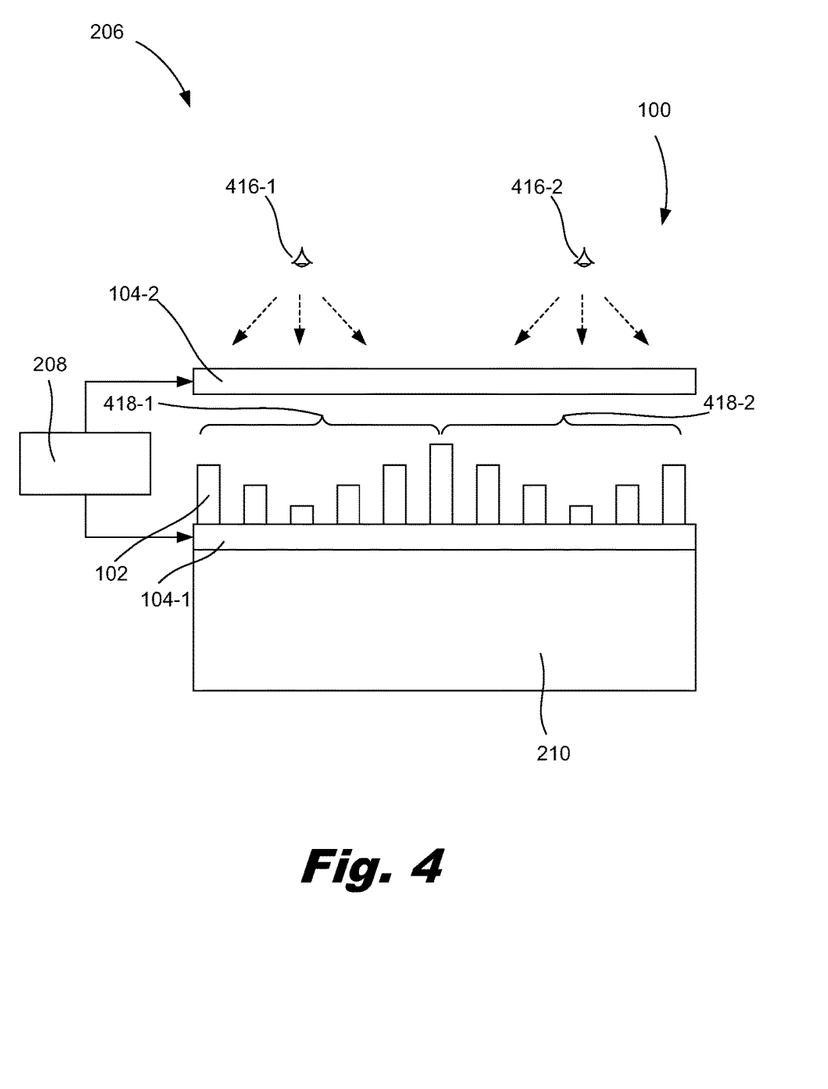
FIG. 4 is a diagram of a system with multiple PDLCs, according to another example of the principles described herein.

FIG. 4 is a diagram of a system (206) with multiple PDLCs (102), according to another example of the principles described herein. In some examples, the device (100) may provide for multiple independent viewing areas for a single display screen. In other words, the device (100) may allow for one user (416) to view one area of the underlying electronic device display screen without being able to view an adjacent or other portion of the underlying electronic device display screen. In this example, the multiple PDLCs (102) may be divided into a number of groups (416-1, 416-2). Each group (416) has a corresponding viewing area and corresponds to a portion of the underlying substrate (210). When a user (416) is within the viewing area for a particular group (416), the user may view the corresponding portion of the underlying substrate (210) while users outside of the viewing area for the particular group (416) are prevented from viewing the corresponding portion of the underlying substrate (210). For example, a first user (416-1) being within a viewing area of a first group (418-1) of PDLCs (102) may view the corresponding portion of the electronic display screen. By comparison, a second user (416-2) being outside the viewing area of the first group (418-1) of PDLCs (102) is prevented from seeing the portion of the electronic display screen that corresponds to the first group (418-1). Similarly, a second user (416-2) being within a viewing area of a second group (418-2) of PDLCs (102) may view the corresponding portion of the electronic display screen. By comparison, a first user (416-1) being outside the viewing area of the second group (418-2) of PDLCs (102) is prevented from seeing the portion of the electronic display screen that corresponds to the second group (418-2).

Figure 5:
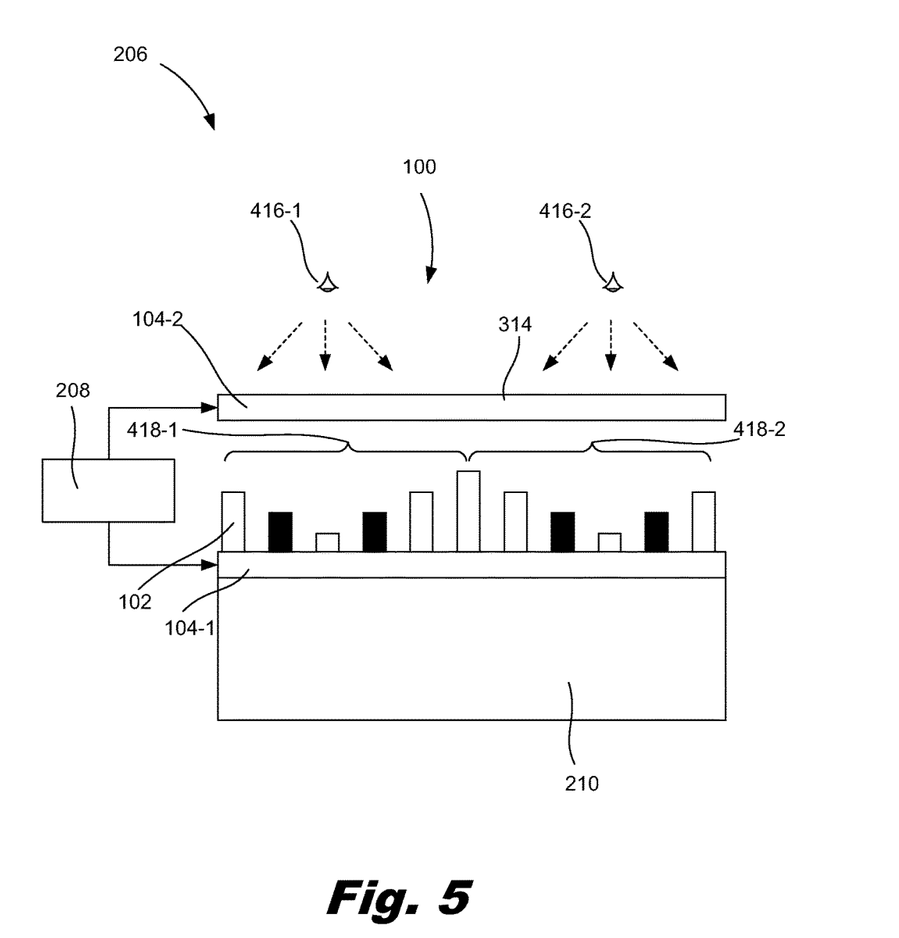
FIG. 5 is a diagram of a system with multiple PDLCs, according to another example of the principles described herein.

To create these distinct viewing areas, PDLCs (102) at the peripheries or borders of a group (418) are taller than PDLCs (102) that are farther away from, or that are near the center, of the group (418). In this example, the taller PDLCs (102) at the peripheries prevent users (416) outside of the viewing area from viewing a portion of the underlying display screen. For example, a first user (416-1) may be within the viewing area of a first group (418-1) and as such can view a corresponding portion of the underlying display screen. By contrast, the first user (416-1) may not be able to view the portion of the display screen corresponding to the second group (418-2) on account of the privacy offered by the taller PDLCs (102) near the border of the first group (418-1) and the second group (418-2). In this example the viewing areas of the different groups (418) do not overlap such that those who can view one portion of the screen cannot view another portion of the screen. In some examples, as depicted in FIG. 5, the device (100) may be a multi-modal driving device (100) as indicated by the alternating black and white filled PDLCs (102).

In this system (206), a single switch controller (208) may be used to effectuate different voltage potentials across the number of groups (418) such that each group (418) of PDLCs (102) may be individually controlled thus allowing for independent privacy control for each group (418) and corresponding portion of the underlying display screen. For example, the first group (418-1) may be controlled by a voltage received from the first electrode (104-1) while the second group (418-2) may be controlled by a voltage received from the second electrode (104-2). While FIGS. 4 and 5 depict two users viewing a display screen, any number of users may independently view different portions of the screen by using different numbers of groups (418) of PDLCs (102). Forming the PDLCs (102) into different groups (418) may allow for one display screen to facilitate, or offer a service to, multiple users (416) while allowing each user (416) to view a reduced portion of the display screen. In this example, multiple instances of sensitive or confidential information may be presented to a user (416) while preserving the confidentiality of the information to nearby users (416).

Figure 6:
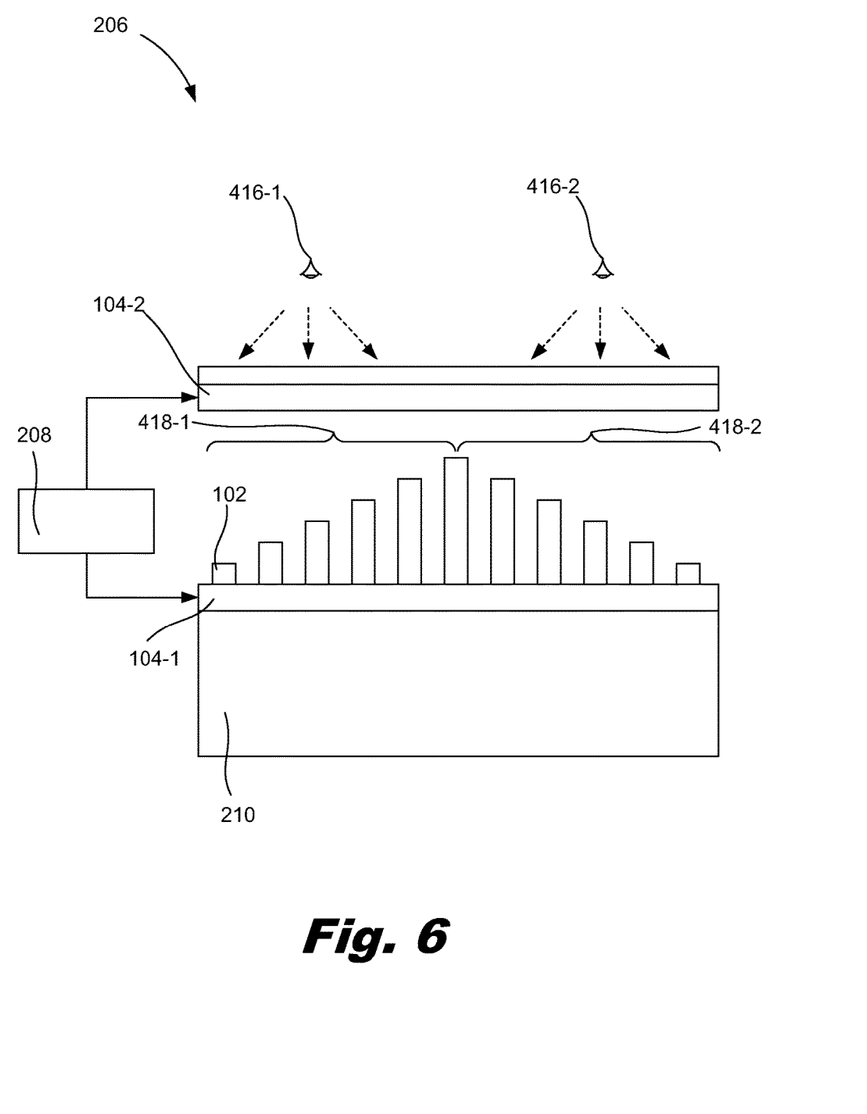
FIG. 6 is a diagram of a system with multiple PDLCs, according to another example of the principles described herein.

FIG. 6 is a diagram of a system (206) with multiple PDLCs (102), according to another example of the principles described herein. In the example depicted in FIG. 6, taller PDLCs (102) are disposed near the peripheries or borders of the groups (418-1, 418-2) while shorter PDLCs (102) are disposed near the edges of the substrate (210). In this example, privacy is still maintained between users (416-1, 416-2) but a different viewing area, and different level of privacy is provided by the device (100).

Certain examples of the present disclosure are directed to a system and method for providing increased privacy control for electronic displays that 1) provide a number of private viewing areas on a screen; 2) protect sensitive data from inadvertent or malicious viewers; 3) offer a user friendly solution with multiple driving technologies: 4) allows multiple users to view different secure information on one display screen; and 5) provides greater flexibility in selecting a degree of privacy control. However, it is contemplated that the devices and systems disclosed herein may prove useful in addressing other deficiencies in a number of technical areas. Therefore the systems and devices disclosed herein should not be construed as addressing just the particular elements or deficiencies discussed herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A device comprising:
   at least one electrode; and
   multiple polymer dispersed liquid crystals (PDLCs) of varying height disposed between the at least one electrode and a viewer of the device, wherein a PDLC in one state allows for viewing of an underlying substrate and in another state prevents the viewing of an underlying substrate.

2. The device of claim 1, wherein:
   the at least one electrode comprises a first electrode and a second electrode; and
   the multiple PDLCs are disposed between the first electrode and the second electrode.

3. The device of claim 2, further comprising a switch controller coupled to the first electrode and second electrode to effectuate a voltage potential across the multiple PDLCs.

4. The device of claim 1, wherein the multiple PDLCs are divided into a number of groups, a group allowing a user within a viewing area of the group to view a corresponding portion of an underlying substrate and preventing a user outside of the viewing area from viewing the corresponding portion of the underlying substrate.

5. The device of claim 4, further comprising a switch controller to effectuate different voltage potentials across different groups.

6. The device of claim 4, wherein PDLCs that are at peripheries of a group are taller than PDLCs that are at a center of a group.

7. The device of claim 4, wherein PDLCs nearest the focal point of a viewing area are smaller than other PDLCs within the group.

8. A device comprising:
   a substrate;
   a privacy control layer, the privacy control layer comprising:
      multiple polymer dispersed liquid crystals (PDLCs) dispersed in a matrix comprising at least one of a glass and a plastic, wherein the multiple PDLCs are of varying height and are divided into groups, each group of PDLCs to:
         allow viewing of the substrate from within a viewing area of the group; and
         prevent viewing of the substrate outside of the viewing area of the group; and
      a first electrode and a second electrode disposed on either side of the multiple PDLCs to generate a voltage potential across the multiple PDLCs.

9. The device of claim 8, wherein the substrate is a display screen of an electronic device.

10. The device of claim 8, further comprising a cover lens disposed on at least one of the first electrode and the second electrode.

11. The device of claim 8, wherein each group corresponds to a different region of the substrate.

12. The device of claim 8, wherein the privacy control layer is a multi-modal privacy control layer.

13. A system comprising:
   a substrate;
   a first transparent electrode;
   a second transparent electrode;
   a privacy control layer disposed between the first transparent electrode and the second transparent electrode, the privacy control layer comprising multiple polymer dispersed liquid crystals (PDLCs) dispersed in a matrix comprising at least one of a glass and a plastic, wherein the multiple PDLCs are of varying height; and
   a switch controller to provide an activation energy to the first transparent electrode and the second transparent electrode, wherein the activation energy turns the multiple PDLCs on and off.

14. The system of claim 13, wherein the switch controller provides different activation energies to adjust different viewing areas.

15. The system of claim 13, wherein the switch controller provides different activation energies to render the multiple PDLCs transparent or opaque.

16. The device of claim 1, wherein the at least one electrode comprises one electrode.

17. The device of claim 4, wherein the number of groups comprises multiple groups.

18. The device of claim 1, wherein the device is a multi-modal device.

19. The device of claim 3, wherein:
   the first electrode is coupled to a first group of PDLCs; and
   the second electrode is coupled to a second group of PDLCs.

20. The device of claim 19, wherein the first electrode provides a first voltage across the first group and the second electrode provides a second, and different, voltage across the second group.

* * * * *